(12) United States Patent
Diefenbaugh et al.

(10) Patent No.: US 7,281,074 B2
(45) Date of Patent: Oct. 9, 2007

(54) METHOD AND APPARATUS TO QUIESCE USB ACTIVITIES USING INTERRUPT DESCRIPTOR CACHING AND ASYNCHRONOUS NOTIFICATIONS

(75) Inventors: Paul S. Diefenbaugh, Portland, OR (US); James Kardach, Saratoga, CA (US); Barnes Cooper, Tigard, OR (US); Leslie E. Cline, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 11/171,833

(22) Filed: Jun. 29, 2005

(65) Prior Publication Data

US 2007/0005859 A1 Jan. 4, 2007

(51) Int. Cl.
*G06F 13/10* (2006.01)
*G06F 13/38* (2006.01)
*G06F 13/14* (2006.01)

(52) U.S. Cl. .................... 710/260; 710/19; 710/47; 710/313

(58) Field of Classification Search .............. None
See application file for complete search history.

(56) References Cited

U.S. PATENT DOCUMENTS

| | | | | |
|---|---|---|---|---|
| 5,926,841 A * | 7/1999 | Novak et al. | | 711/208 |
| 6,119,194 A * | 9/2000 | Miranda et al. | | 710/306 |
| 6,496,891 B1 * | 12/2002 | Cluff et al. | | 710/260 |
| 6,721,815 B1 * | 4/2004 | Leete | | 710/6 |
| 6,742,076 B2 * | 5/2004 | Wang et al. | | 710/314 |
| 6,938,103 B2 * | 8/2005 | Azzarito et al. | | 710/6 |
| 6,957,356 B2 * | 10/2005 | Leete | | 713/502 |
| 7,007,119 B2 * | 2/2006 | Howard et al. | | 710/100 |
| 7,035,948 B1 * | 4/2006 | Liang et al. | | 710/56 |
| 7,073,006 B2 * | 7/2006 | Nguyen | | 710/260 |
| 2002/0116565 A1 * | 8/2002 | Wang et al. | | 710/313 |
| 2003/0005197 A1 * | 1/2003 | Abramson et al. | | 710/300 |
| 2003/0028697 A1 * | 2/2003 | Nguyen | | 710/260 |
| 2003/0079061 A1 * | 4/2003 | Azzarito et al. | | 710/5 |
| 2003/0177297 A1 * | 9/2003 | Hesse et al. | | 710/305 |

(Continued)

FOREIGN PATENT DOCUMENTS

WO  WO 2004102406 A1 * 11/2004

OTHER PUBLICATIONS

"Advanced Configuration and Power Interface Specification", Compaq Computer Corporation, Intel Corporation, Phoenix Technologies Ltd., Toshiba Corporation, Revision 2.0b, Oct. 11, 2002, 502pp.

*Primary Examiner*—Paul R. Myers
*Assistant Examiner*—Ryan M Stiglic
(74) *Attorney, Agent, or Firm*—Blakely, Sokoloff, Taylor & Zafman LLP (57) ABSTRACT

In one embodiment, a data processing system includes, but is not limited to, a processor, a memory coupled to the processor, and a universal serial bus (USB) controller coupled to the processor and the memory. The USB controller includes a local memory to cache at least one activity descriptor of at least a portion of a periodic schedule having multiple frames stored in the main memory. The USB controller defers to service an active USB device described by one of the activity descriptors until a corresponding frame is scheduled to be serviced subsequently. Other methods and apparatuses are also described.

20 Claims, 8 Drawing Sheets

U.S. PATENT DOCUMENTS

| | | | |
|---|---|---|---|
| 2003/0200360 A1* | 10/2003 | Saito et al. | 710/5 |
| 2004/0017772 A1* | 1/2004 | Saito et al. | 370/229 |
| 2004/0030840 A1* | 2/2004 | Hesse et al. | 711/137 |
| 2004/0093437 A1* | 5/2004 | Leete | 710/15 |
| 2004/0210698 A1* | 10/2004 | Nguyen | 710/260 |
| 2005/0033869 A1* | 2/2005 | Cline | 710/8 |
| 2005/0033896 A1* | 2/2005 | Wang et al. | 710/314 |
| 2005/0125796 A1* | 6/2005 | Vargas et al. | 718/100 |
| 2005/0249143 A1* | 11/2005 | Tee et al. | 370/315 |
| 2006/0036776 A1* | 2/2006 | Ferguson et al. | 710/5 |
| 2006/0123180 A1* | 6/2006 | Derr et al. | 710/308 |
| 2006/0123181 A1* | 6/2006 | Aull et al. | 710/310 |

* cited by examiner

METHOD AND APPARATUS TO QUIESCE USB ACTIVITIES USING INTERRUPT DESCRIPTOR CACHING AND ASYNCHRONOUS NOTIFICATIONS

FIELD

Embodiments of the invention relate to a computer system; and more specifically, to a USB (universal serial bus) controller having an interrupt descriptor cache and asynchronous notification mechanism.

BACKGROUND

A computer system may be equipped with a universal serial bus (USB). USB ports allow USB-enabled devices to connect and communicate with the computer system. Examples of electronic devices that communicate with computer systems through USB ports include digital cameras, keyboards, hard drives, and printers.

A USB host is in charge of the USB bus in a computer system. The USB host is a collection of software and hardware inside the computer system that supports the USB bus. The USB host is typically responsible for identifying devices that are connected to a USB port. The USB host may then load any needed device drivers dynamically. Finally, the USB host may periodically poll each of the attached devices for data communications.

Typically, USB host controllers have conflicts with platform power saving states on a mobile system due to the USB controller's reliance on a main memory for much of its operating state, frequent accesses to the main memory even during periods of idleness, poll-based model for device interrupt generation, and other mobile-unfriendly behavior.

BRIEF DESCRIPTION OF THE DRAWINGS

Embodiments of the invention may best be understood by referring to the following description and accompanying drawings that are used to illustrate embodiments of the invention. In the drawings.

DETAILED DESCRIPTION

Method and apparatus to quiesce USB activities using interrupt caching and notifications are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

The majority of activities in a USB subsystem of an idle system is related to detecting device interrupts, where a USB controller may have to constantly or repeatedly poll interrupt-generating devices (e.g., keyboards, mice, network adaptors, disk drives, etc.) which require substantial accesses of the main memory, as the USB specification provides no means for asynchronous notifications when an associated link is in a non-suspended state. A USB host controller may have to access the linked list structure directly from main memory. However, constantly or repeatedly access of main memory may require constantly or repeatedly snooping of a processor's cache. As a result, the processor may be prevented from being placed in a low power mode.

Many processors can operate in a variety of power states. For example, some processors use five "C" states. In this example, a processor is in the "C0" state if the processor is operating at full power. The processor is in the "C1" state if the processor gates some internal clocks. The processor is in the "C2" state if an external device drives a pin to the processor to stop internal clocks. However, in the C2 state, the processor cache may still be snooped. The "C3" state is similar to the "C2" state. In the C3 state, however, the cache may not be snooped. Finally, the processor is in the "C4" state if internal clocks are stopped and the processor voltage level is decreased. The C0, C1, C2, C3, and C4 states may be similar to or equal to the processor states defined by the Advanced Configuration and Power Interface (ACPI) specification originally published in 2002.

As a result, placing a link into a suspended state provides significant power saving benefits, but some issues inhibit or preclude the usage of the suspend state, including a considerable entry (e.g., a proximately 3 milliseconds or ms) and exit (e.g., greater than 100 ms) latency, dependent upon the operating system and driver support and/or requirement that all devices on a link are idle and support this state, etc.

USB data may be delivered isochronously. Software (e.g., a USB compatible driver) usually schedules a USB periodic list (also referred to as a periodic schedule) to communicate data transfer and interrupt polling information to a USB host controller (also simply referred to as a USB controller). Such a periodic schedule structure may be stored in the main memory of a computer system. Typically, software creates these structures in the main memory, allocates a set of interrupt descriptors for each device endpoint supporting interrupt transfers, and links these structures at a level relative to a desired periodic polling rate, as shown in FIG. 1A according to certain embodiments of the invention.

Figure 1A:
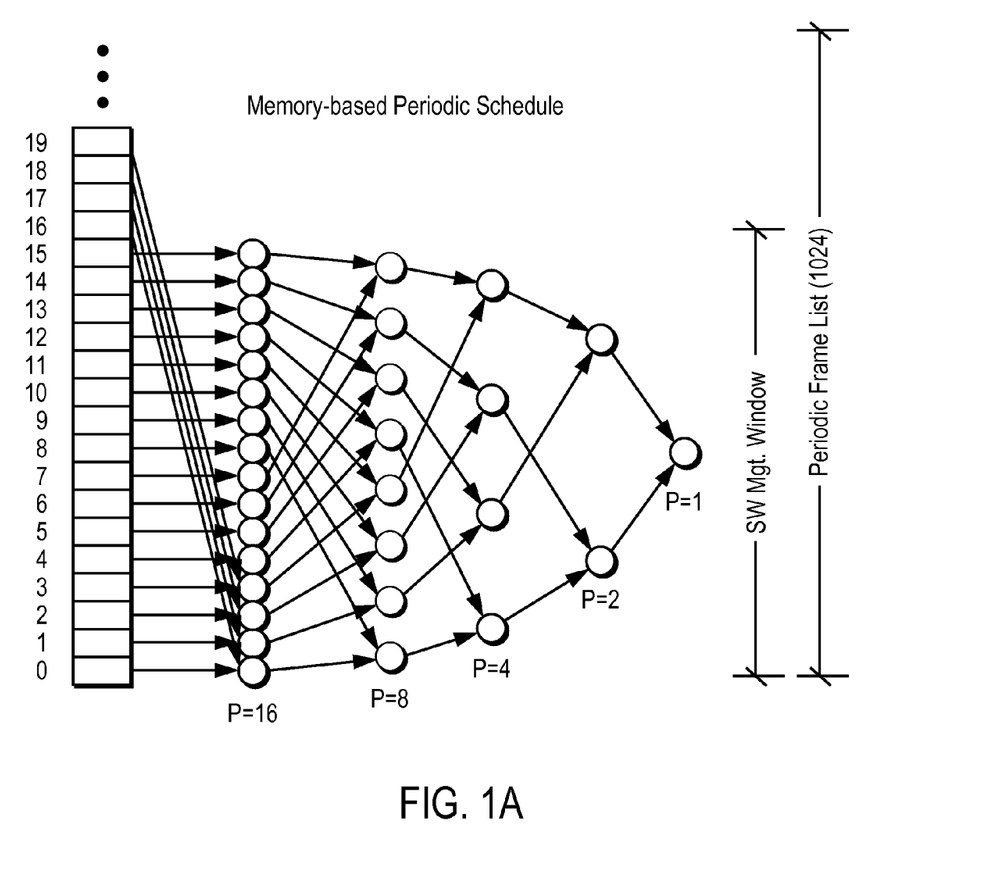
FIGS. 1A and 1B are diagrams illustrating processes for scanning USB devices.

For example, interrupt descriptors for most devices (e.g., mice and keyboard) are serviced at an 8 ms periodic rate and thus may be linked at a second level (e.g., P=8 as shown in FIG. 1A). A periodic schedule structure is used by a USB host controller to detect and service devices' interrupts. Each interrupt descriptor includes information required by the USB host controller to generate an interrupt transfer to poll a single device endpoint. The interrupt descriptor also indicates where the USB host controller should write any data returned by the device endpoint upon a successful interrupt transfer. An interrupt descriptor typically consists of a pair of data structures (queue head and transfer descriptor) as defined by the USB specification, as shown in FIG. 1B, for example.

Figure 1B:
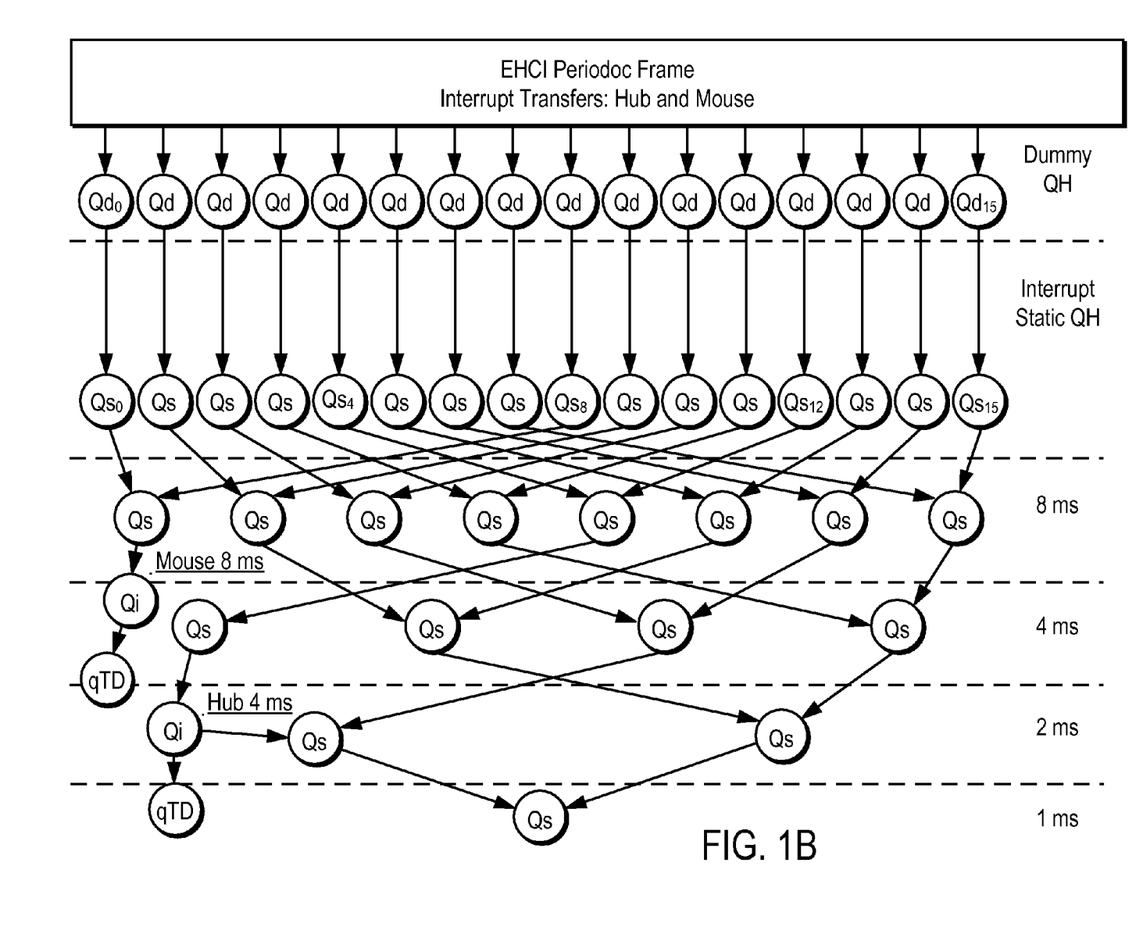

Referring to FIG. 1B, in this example by way of illustrations and not by way of limitations, the static elements of the periodic schedule (Qd, Qs) are used to form a binary tree in memory with a specified top-level width representing the software management window (e.g. 16 top-level dummy queue heads=16 ms). The next level of static queue heads are used for polling intervals of 16 ms and so on, to the bottom level which equals a 1 ms polling interval. Note that the configuration in FIG. 1B is shown for illustration purposes only. Other configurations may exist.

Note that, in certain situations dependent upon specific configurations of a system, the periodic schedule structures and linkage are relatively static, especially for internal devices that cannot be inserted or removed (e.g., hot-plug). The software management window as shown in FIG. 1A is typically a small subset of the entire schedule. For example, a period of 32 ms in an operating system similar to Windows™ XP from Microsoft Corporation of Redmond, Wash. may correspond to the first 32 entries of a total of 1024-entry frame list, which may include one or more frames (e.g., a 1 millisecond block of time), microframes (e.g., a 125 microsecond block of time), or a combination of both (hereinafter in general referred to as [micro] frames or simply frames). Subsequent [micro] frame list entries may simply point back to previous entries (e.g., similar to a circular buffer) as shown in FIG. 1A. Changes to the periodic schedule by software are therefore contained within the software management window. The software management window is a relatively small (in comparison to the length of the [micro] frame list array) window of data structures through which substantially all interrupt and isochronous data structures or streams are managed by the system software.

Figure 2A:
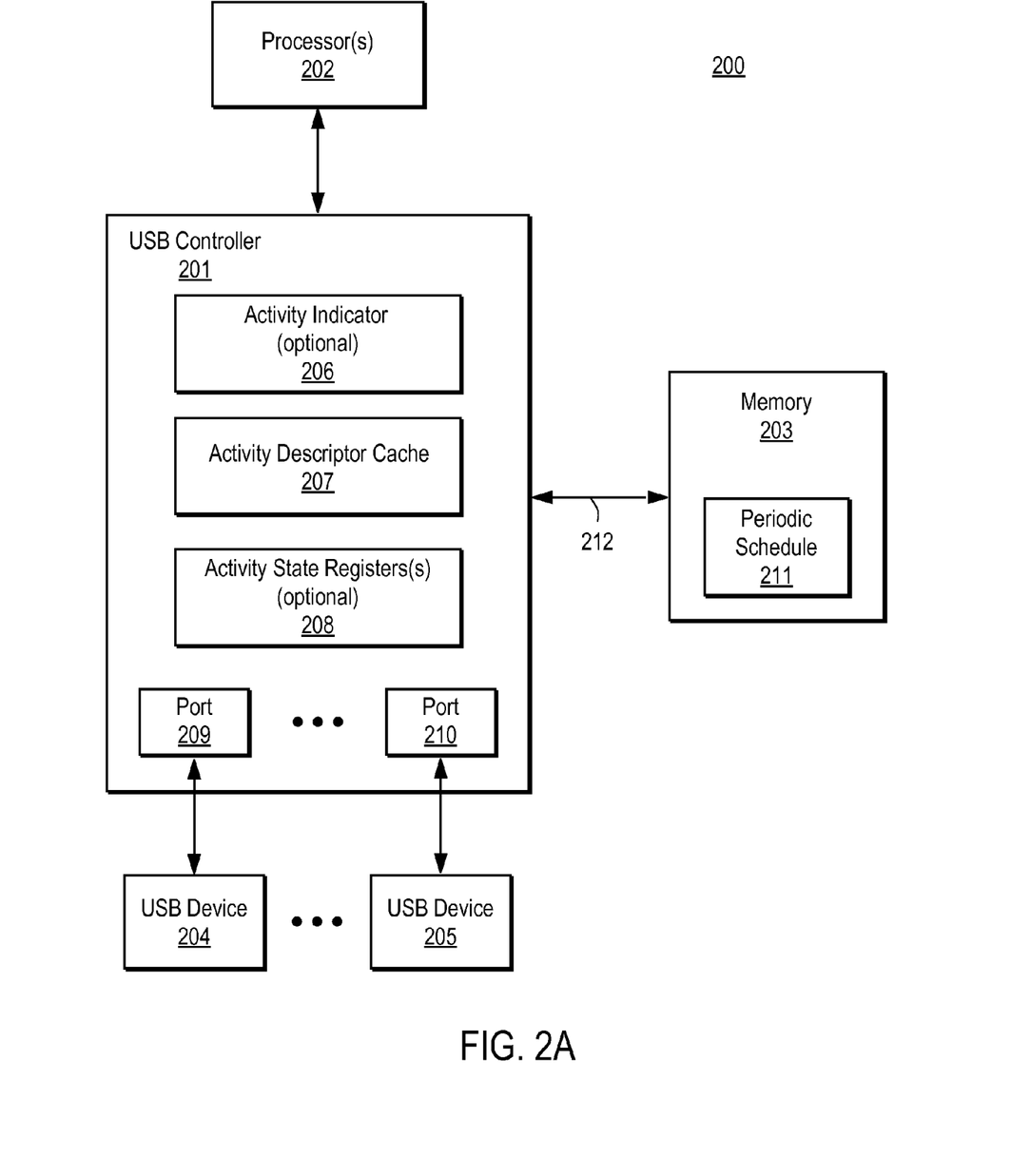
FIGS. 2A and 2B are block diagrams illustrating examples of USB system configuration according to certain embodiments.

FIG. 2A is a block diagram illustrating an example of a peripheral bus controller configuration according to one embodiment. For example, configuration 200 may be implemented within a host computer, such as a mobile platform (e.g., a portable computer or a handheld device, etc.). Throughout the present application, USB is used as an example of a peripheral bus. However, it is not so limited, the techniques described herein may be applied to other types of peripheral buses, such as, for example, PCI (peripheral component interface) related buses, other IEEE standard 1394 compatible buses, and/or Firewire, etc.

Referring to FIG. 2A, configuration 200 includes, but is not limited to, a USB controller 201 coupled to one or more processors 202 and memory 203. The USB controller 201 is used to support one or more USB devices 204-205 via one or more USB ports 209-210. The memory 203 may be the main memory of a data processing system and may store a periodic schedule 211, also referred to as a periodic [micro] frame list as shown in FIG. 1A. The periodic schedule 211 is constructed by software, such as, for example, a USB driver, including a list of data structures each corresponding to a [micro] frame. The periodic schedule 211 may be implemented as a binary tree (as show in FIG. 1A), linked-list, or some other types of data structures.

Activity descriptors are added to the periodic schedule, typically by linking an isochronous descriptor and/or interrupt descriptor to one or more elements in the periodic schedule structure. An activity descriptor informs the USB host controller of a specific data transfer for a specific device endpoint at a specific moment in time (frame or microframe).

Referring back to FIG. 1B, this example shows two interrupt descriptors (one for a hub and another for a mouse) consisting of a pair of data structures (Qi, qTD), where the hub is polled at a 4 ms rate and the mouse at 8 ms. Interrupt descriptors (Qi, QTD) provide the host controller with all of the information it needs to generate an interrupt transfer to poll a USB device (e.g., an endpoint in USB), as well as a memory location to write the results if/when the device actually had an outstanding interrupt.

The purpose of the activity descriptor cache therefore, in this example, is to hold a copy of these interrupt descriptors so that the host controller does not have to access the main memory to generate an interrupt transfer. In one embodiment, there is one interrupt descriptor per device (e.g., endpoint), regardless of its polling frequency.

Referring back to FIG. 2A, according to one embodiment, the USB controller 201 includes a prefetcher (not shown) to prefetch or cache at least a portion of the activity descriptors from the periodic schedule 211 from the main memory 203 via a memory bus or interconnect 212. The fetched activity descriptors may be stored in an activity descriptor cache 207. In addition, the USB controller 201 may further determine whether any device in the [micro] frames is active and optionally store such information in the activity indicator 206 within the USB controller.

Note that the sizes of the activity indicator and/or the activity descriptor cache may vary dependent upon a specific configuration of a system, such as, for example, the size of the periodic schedule and/or software management window, etc. In one embodiment, only a portion of the periodic schedule, such as, for example, interrupt descriptors, may be cached in the activity indicator without caching the entire periodic schedule, which requires relatively large amount of cache memory. However, it is not so limited. Dependent upon the size of activity cache or a specific configuration of the host controller, more or less information from the periodic schedule may be cached. Also note that throughout the present application, an interrupt is used to represent an activity associated with a device, either initiated from the device, the controller, or the operating system, etc.

According to one embodiment, the USB controller 201 may access the periodic schedule 211 stored in the memory 203 whenever the USB controller 201 has a chance (e.g., awake) and stores the activity information of the periodic schedule regarding whether a specific [micro] frame includes activity in the activity indicator 206. In addition, the USB controller 201 caches all activity descriptors of the [micro] frames having one or more active devices in the activity descriptor cache. In one embodiment, caching prevents the USB host controller 201 from having to re-access main memory 203 for every [micro] frame, allowing the processor 202 and memory 203 to remain in a relatively low-power state.

According to one embodiment, the USB controller 201 can go back to a relatively lower-power state until a corresponding [micro] frame (which indicated by the activity indicator) is scheduled to be serviced. Upon the corresponding [micro] frame, the USB controller 201 may service the interrupt transfer associated with the [micro] frame being serviced using the interrupt descriptor information cached in the activity descriptor cache 207 without having to access the main memory 203 again.

Furthermore, the USB controller 201 may further include an activity state register or registers 208 to store information regarding whether a particular device (e.g., devices 204-205) supports an asynchronous notification and whether any of the devices that support such asynchronous notification has a pending activity (e.g., pending interrupt to be serviced). Thus, the USB controller 201 knows which of the devices supports the asynchronous notification and/or has a pending interrupt. As a result, those devices can remain in a relatively low power state until the corresponding [micro] frame arrives (e.g., USB host controller defers all interrupt transfers to a device until the device signals it has a pending interrupt).

According to one embodiment, asynchronous notifications allow the host controller 201, client devices 204-205, and USB physical links to remain in a low-power state when idle (that is, until an interrupt is detected). The interrupt state registers (e.g., register or registers 208) are used by the host controller 201 to track which of the USB ports 209-210 (e.g., internal or external devices) supports asynchronous interrupts and to identify which device has caused an interrupt when one occurs. If all interrupt-capable client devices support asynchronous notifications, the internal controller logic can enter and remain in a relatively low-power state indefinitely until either an interrupt is detected or software places other activities (e.g. asynchronous or isochronous traffic) on one of the USB schedules.

In one embodiment, when a device generates an asynchronous notification the controller can wake, identify which device caused the interrupt, locate this device's next interrupt descriptor in the cache, go back to sleep until the corresponding [micro] frame, and then wake on this [micro] frame to generate an interrupt transfer. In one embodiment, when an asynchronous notification (e.g., asynchronous interrupt) is received by the host controller, an interrupt descriptor associated with the asynchronous notification may or may not have been cached within the host controller (e.g., activity descriptor cache). If the associated interrupt descriptor has not been cached within the host controller at the time the notification is received (e.g., the associated interrupt descriptor still resides in the main memory), the host controller could access the periodic schedule in the main memory, locate the interrupt descriptor, and complete the interrupt transaction substantially immediately or in a deferred manner described above, with or without caching the associated interrupt descriptor. Other models for servicing device interrupts can also be implemented, such as, for example, generating the interrupt transfer immediately but caching the results until the corresponding [micro] frame, or simply servicing the complete interrupt at the time it is signaled.

Meanwhile, for those devices that do not support such an asynchronous notification, the USB controller 201 may have to poll those devices. However, those devices supporting the asynchronous notification may still remain in a relatively low power state during the polling operations of other devices, since supporting devices would not need to be polled. Note that the USB host controller has some awareness of the top-level (e.g. root port) USB topology in the form of the activity state registers 208. In a conventional system, the polling is typically performed in a broadcast manner to all ports. Therefore, an additional amount of power can be saved.

Figure 2B:
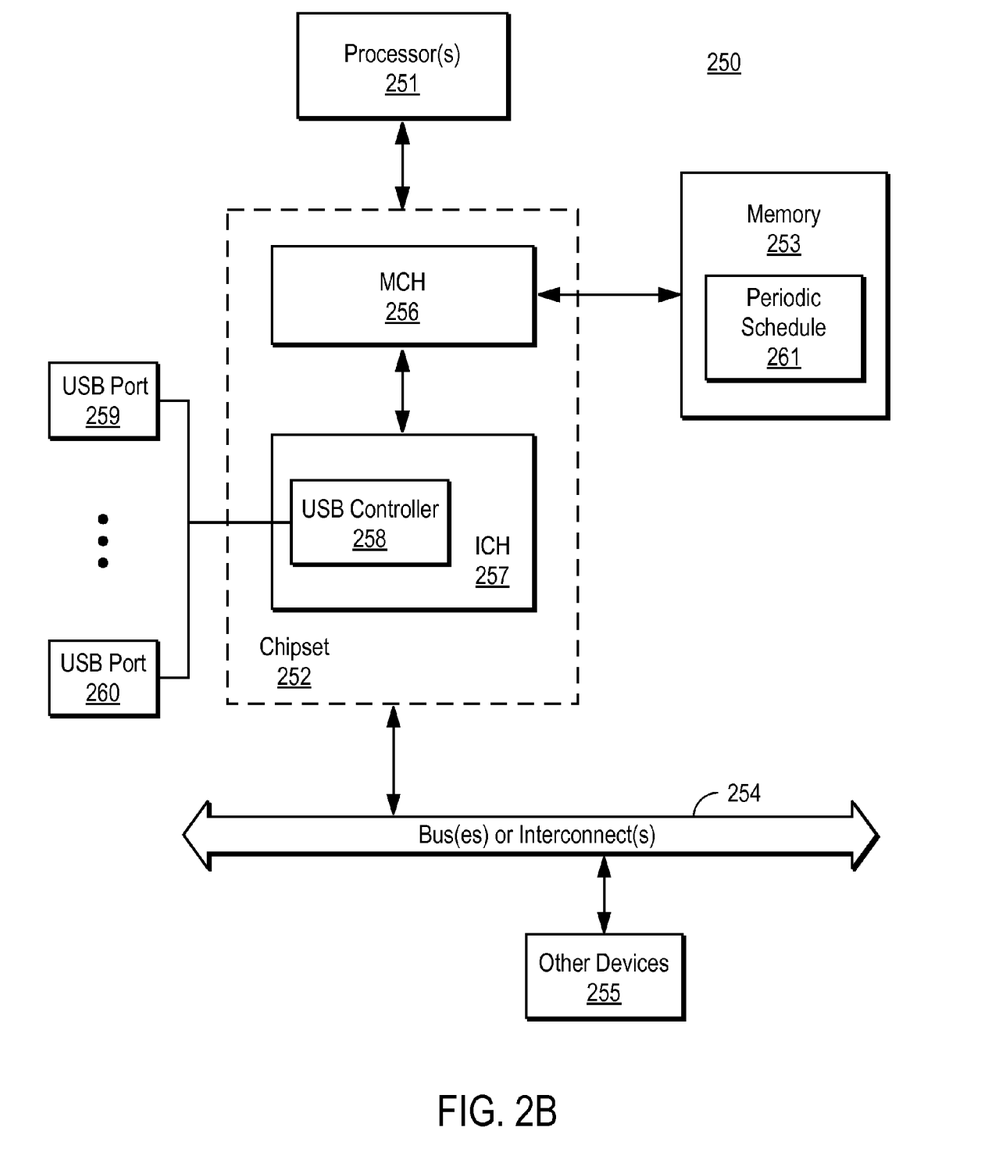

FIG. 2B is a block diagram of a USB configuration according to an alternative embodiment. In one embodiment, system 250 includes a chipset 252 coupling a bus or interconnect 254 with the processor 251. The chipset 252 may be a single chipset including the processor 251. Processor 251 may include multiple processors or core logics, physically or logically. In one embodiment, the chipset 252 includes, but is not limited to, a memory controller hub (MCH) 256 for accessing memory 253 and an IO controller hub (ICH) 257 for accessing IO devices (e.g., devices 255) via the bus or interconnect 254. One embodiment, a USB controller 258 may be coupled to or embedded within the ICH 257. The USB controller 258 controls one or more USB ports 259-260 as interfaces to one or more USB compatible devices, internally or externally. In one embodiment, the USB controller 258 may be implemented using one or more techniques described throughout this application, such as, for example, an activity indicator, an activity descriptor cache, and/or an activity state register, etc. Other components may also be included.

Figure 3:
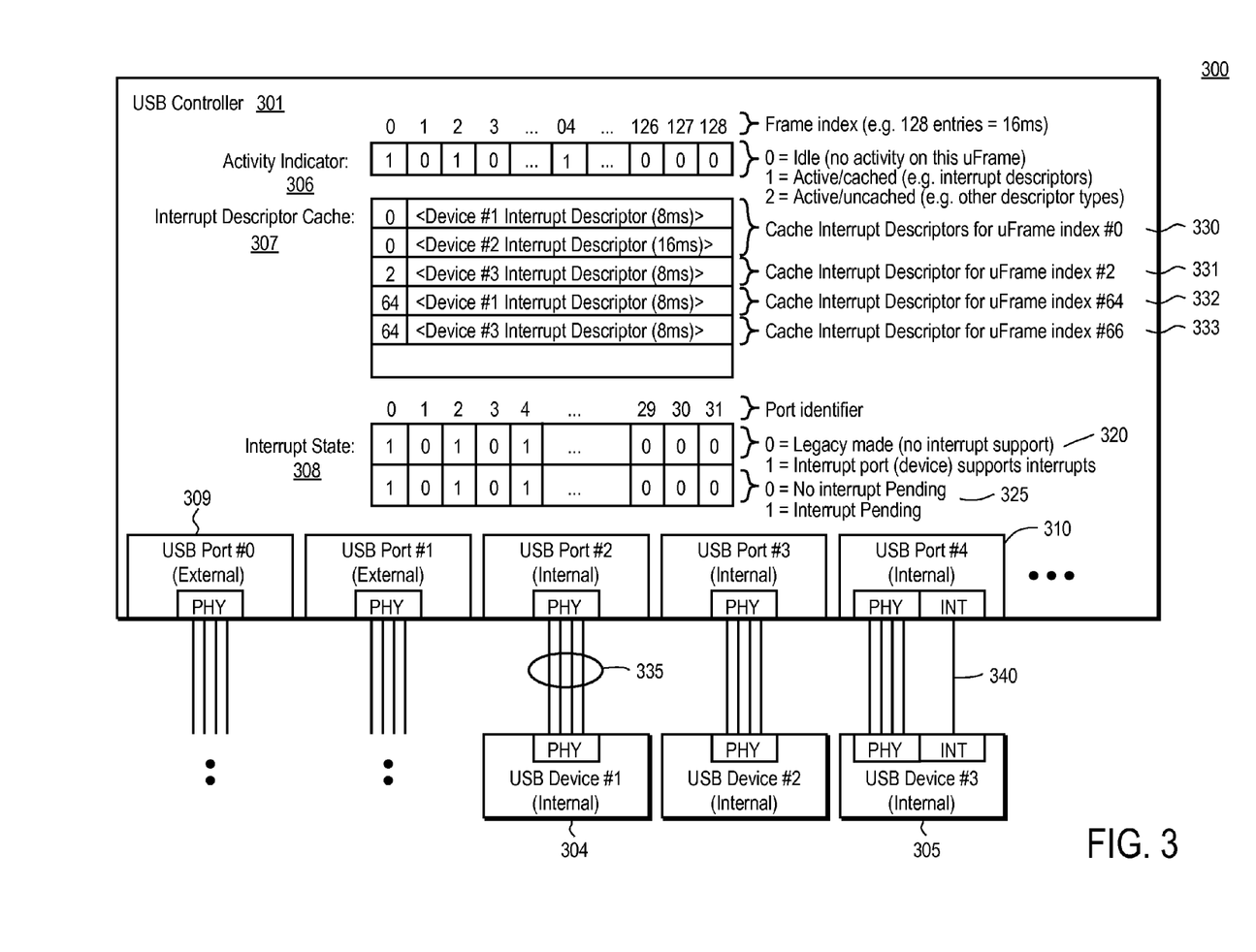
FIG. 3 is a block diagram illustrating an example of USB system configuration according to an alternative embodiment.

FIG. 3 is a block diagram illustrating a USB configuration according to another embodiment of the invention. Configuration 300 includes, but is not limited to, a USB controller 301 coupled to one or more USB devices 304-305 via USB ports 309-310. For example, USB controller 301 may be implemented as USB controller 201 of FIG. 2A, while USB devices 304-305 may be implemented as USB devices 204-205 of FIG. 2A. Note that the configuration 300 shown in FIG. 3 is illustrated as an example only. Other configurations apparent to one with ordinary skill in the art may also be implemented.

Similar to the configuration 200 of FIG. 2A, according to one embodiment, USB controller 301 includes an optional activity indicator or indicators 306, an interrupt descriptor cache 307, and/or an optional interrupt state register or registers 308. For example, the activity indicator 306 may be implemented as activity indicator 206 of FIG. 2A. The interrupt descriptor cache 307 may be implemented as activity descriptor cache 207 of FIG. 2A. The interrupt state register 308 may be implemented as activity state register 208 of FIG. 2A.

In one embodiment, the activity indicator 306 includes multiple entries and each entry is associated with a [micro] frame. For example, if there are 32 [micro] frames within a software management window, the activity indicator 306 may include at least 32 entries. According to one embodiment, the activity indicator 306 may be implemented as a bit-mask having multiple bits. Each bit may be used to indicate whether there is at least one activity descriptor (e.g., an interrupt transfer, etc.) within a [micro] frame associated with the respective bit. A predetermined logical value of a bit indicates that the corresponding [micro] frame includes at least one activity descriptor. For example, a logical value of one indicates that the corresponding [micro] frame includes at least one activity descriptor, while a logical value of zero indicates that no activity descriptors exist within the corresponding [micro] frame.

According to an alternative embodiment, the activity indicator 306 may be implemented as an array of entries and each entry may include multiple bits. Certain values may be used to indicate different activity purposes. For example, in addition to values of one and zero described above, other values (e.g., a value of 2) may be used to indicate that the corresponding [micro] frame includes at least one activity descriptor but it has not been cached (e.g., by the interrupt descriptor cache 307), while a value of one is used to indicate that the corresponding [micro] frame includes at least one active USB device with all interrupt descriptors cached. Other configurations may exist.

According to one embodiment, USB controller 301 is augmented with a controller-accessible buffer 307 for caching interrupt descriptors and support for a mechanism by which devices can asynchronously notify the controller of pending interrupt requests (also referred to as an interrupt descriptor cache or a local memory within the USB controller 301). The interrupt descriptor cache 307 may include multiple entries and each entry may be used to cache an interrupt descriptor for each active USB device within all or part of the periodic schedule. For example, the entries of the interrupt descriptor cache 307 may be used to cache the next 16 subsequent microframes (16 ms), etc.

In one embodiment, the USB controller 301 can prefetch and cache a certain amount of interrupt descriptors of active USB devices, such as, for example, up to 16 ms of active interrupt descriptors from the periodic. In a particular embodiment, for illustrative purposes, three internally-connected USB devices are present and support the interrupt notification mechanism proposed in this invention, with the following attributes for the sake of illustration:

Device #1 connected to Port #2 with a periodic interrupt polling rate of 8 ms and two cached interrupt descriptors at microframe index 0 and 64.

Device #2 connected to Port #3 with a periodic interrupt polling rate of 16 ms and a single cached interrupt descriptor at microframe index 0.

Device #3 connected to Port #4 with a periodic interrupt polling rate of 8 ms and two cached interrupt descriptors at microframe index 2 and 66.

The interrupt descriptor cache 307 is a controller-accessible buffer (e.g. on-die SRAM) of a predetermined size. The size requirement may vary depending on the number of ports and type of internally connected devices employed, but ideally it is long enough to store all active interrupt descriptors encountered during prefetching of the entire software management window of the periodic schedule. In a particular embodiment, an abridged version of the USB interrupt descriptors may be stored locally to minimize memory requirements, and a specific activity indicator flag can be employed to indicate a full buffer (a.k.a. uncached activity exists for a given frame or microframe).

Further, according to one embodiment, USB controller 301 further includes one or more interrupt state registers 308 to indicate whether a particular USB device coupled to a particular USB port (e.g. an internally-connected device) supports an asynchronous notification mechanism and whether such a device has an interrupt pending. In one embodiment, interrupt state registers 308 include a first register 320 having multiple bits and each bit is used to indicate whether a corresponding device coupled to the corresponding USB port supports such an asynchronous notification mechanism. The interrupt state registers 308 further include a second register 325 having multiple bits and each bit is used to indicate whether a particular USB device coupled to the corresponding USB port has an interrupt pending (e.g., needs to be serviced).

The interrupt state registers 308 help the controller identify when it is safe to defer servicing (polling) active interrupt descriptors. Internal ports supporting an asynchronous notification mechanism are tracked to provide backwards compatibility with legacy USB devices, noting a 1-to-1 relationship between port and device is used for some or all of the USB ports, such as, for example, internally connected devices. Additional flags are used to determine whether a particular port/device has indicated that an interrupt is pending.

In one embodiment, the USB controller 301 may scan through the interrupt state registers 308 to determine which of the USB devices needs to be polled. For example, the USB controller 301 may scan register 320 to determine which of the USB devices supports the asynchronous interrupt notification mechanism. The USB controller 301 may further scan register 325 to determine which of the USB devices supporting such an asynchronous notification mechanism (e.g., indicated by the register 320) has an interrupt pending. As a result, the USB controller 301 only has to poll those USB devices that do not support the asynchronous notification mechanism, since the USB controller 301 already knows those USB devices that support the asynchronous notification mechanism via interrupt state registers 308. As a result, those USB devices that support the asynchronous notification mechanism can remain in a relatively low power state while the USB controller 301 polls other USB devices that do not support the asynchronous notification mechanism, for example, using the interrupt descriptor cache 307.

Furthermore, one or more mechanisms for interrupt notifications may be implemented to be supported by the host controller and client devices (externally or internally). For example, according to certain embodiments, this could be an in-band signal such as a low-latency resume signal via a connection 335 (e.g. Ports #2-#3), or alternatively an out-of-band signal such as an interrupt pin (e.g., Port #4), M-Link connection, or similar, via a dedicated connection 340. Note that the support for asynchronous notifications may be detected automatically by the host controller as part of a client device discovery protocol. For example a compatible device might be required to assert an interrupt during initial power-on which then may be discovered by the host controller.

Figure 4:
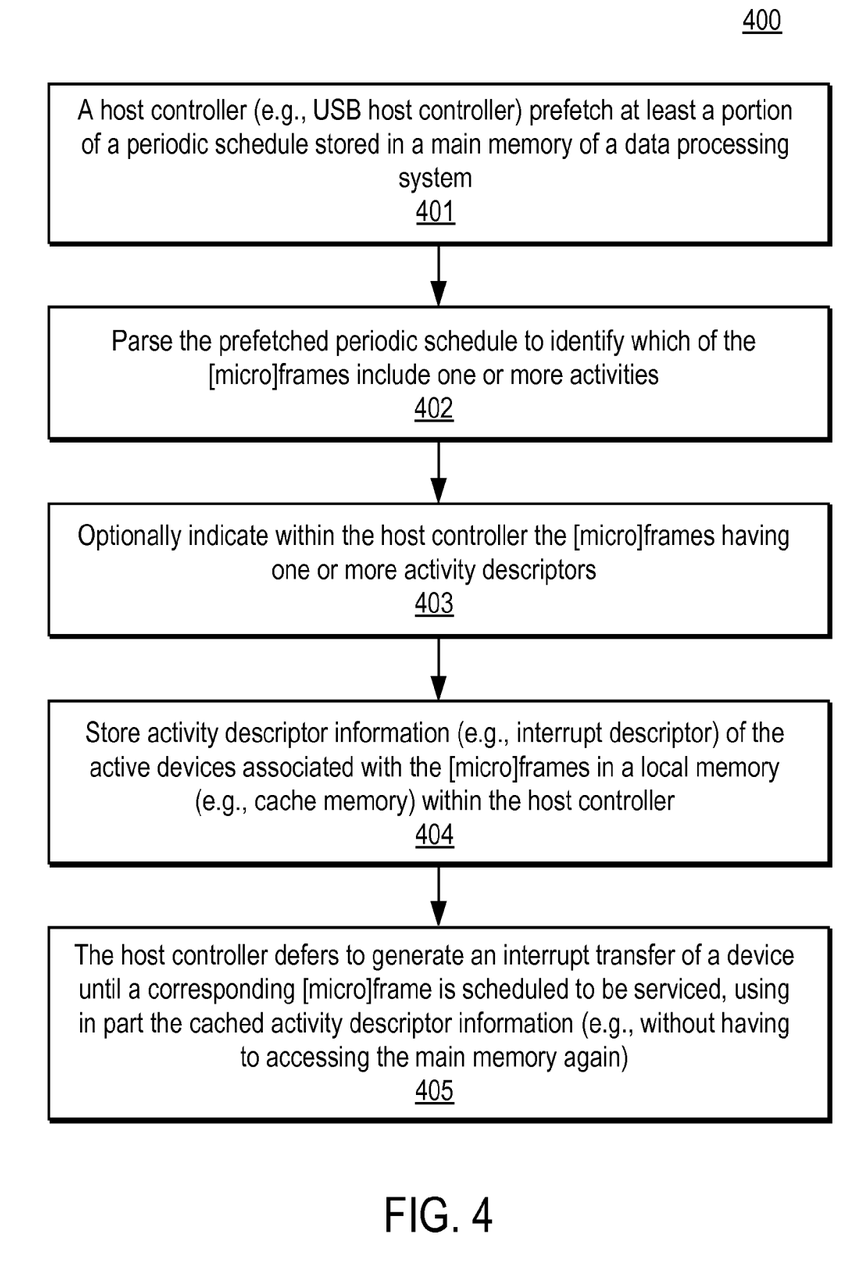
FIG. 4 is a flow diagram illustrating an example of a process of a USB controller according to one embodiment.

FIG. 4 is a flow diagram illustrating an example of a process in accordance with one embodiment. Process 400 may be performed by a processing logic that may include hardware (circuitry, dedicated logic, etc.), software (such as is run on a general purpose computer system or a dedicated machine), or a combination of both. For example, process 400 may be performed by USB controller 201 of FIG. 2A or USB controller 301 of FIG. 3.

Referring to FIG. 4, at block 401, at least a potion of a periodic schedule having multiple [micro] frames is prefetched from a memory (e.g., a main memory of a computer system) to a USB controller. In one embodiment, a prefetcher of the USB controller may perform the prefetch operations. At block 402, the prefetched [micro] frames are parsed by the USB controller to identify which of the [micro] frames includes an active USB device. At block 403, the USB controller optionally indicates (within an activity indicator) the [micro] frames having at least one active USB device. At block 404, the activity descriptors (e.g., interrupt descriptors) of the active USB devices are cached in a local memory of the USB controller. In one embodiment, the activity descriptors include information required by the USB controller to generate an interrupt transfer to an active USB device. At block 405, the USB controller defers to service the activity of an active USB device until a corresponding [micro] frame is scheduled to be serviced using in part the cached activity descriptors without having to access the main memory again. Other operations may also be performed.

Figure 5:
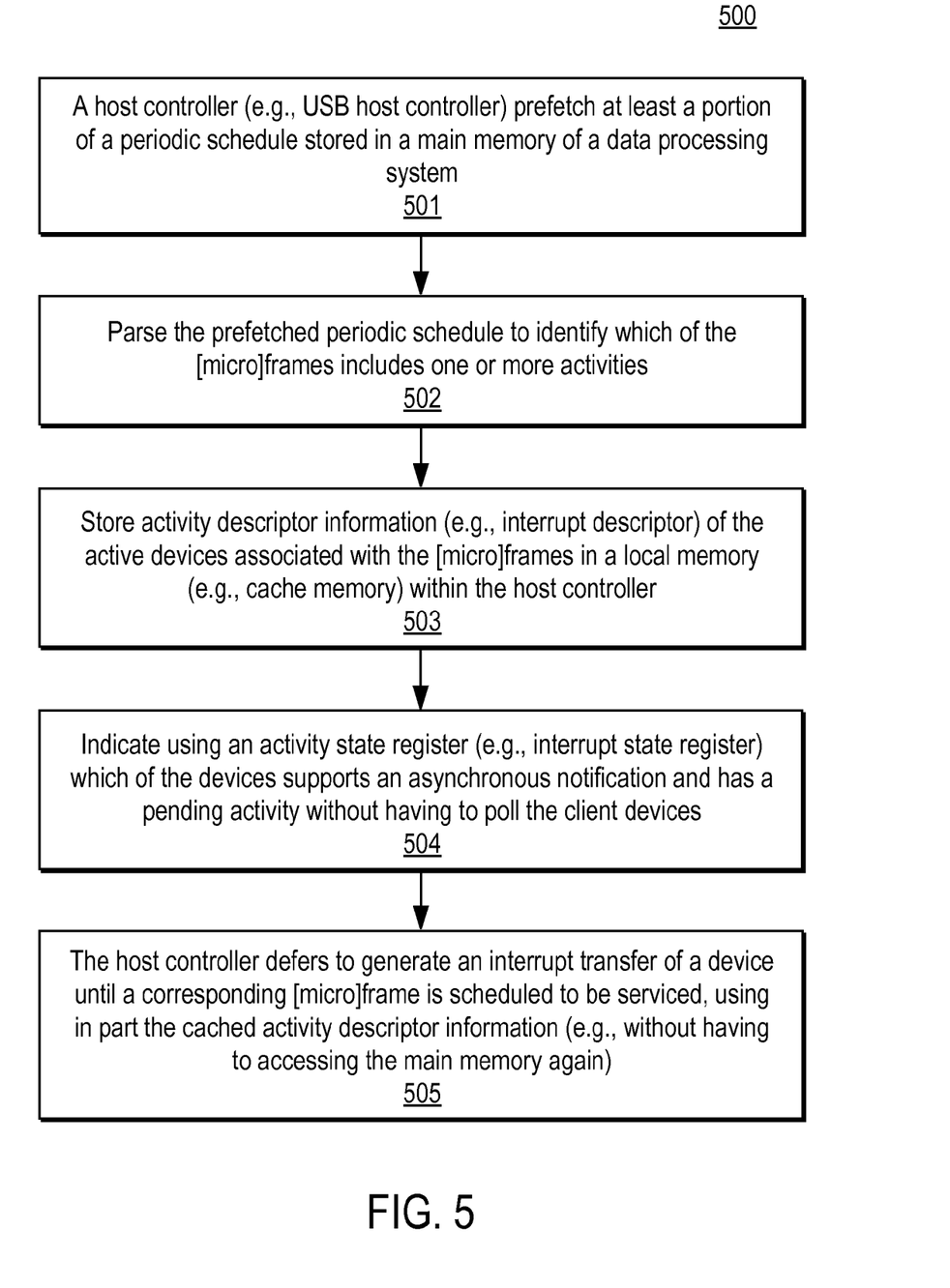
FIG. 5 is a flow diagram illustrating an example of a process of a USB controller according to another embodiment.

FIG. 5 is a flow diagram illustrating an example of a process in accordance with another embodiment. Process 500 may be performed by a processing logic that may include hardware (circuitry, dedicated logic, etc.), software (such as is run on a general purpose computer system or a dedicated machine), or a combination of both. For example, process 500 may be performed by USB controller 201 of FIG. 2A or USB controller 301 of FIG. 3.

Referring to FIG. 5, at block 501, at least a portion of a periodic schedule having multiple [micro] frames is prefetched from a memory (e.g., a main memory of a computer system) to a USB controller. In one embodiment, a prefetcher of the USB controller may perform the prefetch operations. At block 502, the prefetched [micro] frames are parsed by the USB controller to identify which of the [micro] frames includes an active USB device. At block 503, the activity descriptors (e.g., interrupt descriptors) of the active USB devices are cached in a local memory of the USB controller. In one embodiment, the activity descriptors include an interrupt descriptor having information required by the USB controller to generate an interrupt transfer to an active USB device.

At block 504, the USB controller uses an internal register (e.g., interrupt state register) to asynchronously record whether a particular USB device has an interrupt pending and whether the particular USB device supports such an asynchronous notification, as described above. If a USB device supports such an asynchronous notification mechanism, the USB controller does not have to poll such a USB device in order determine whether the USB device is active. As a result, such a USB device can be put into a relatively low power state while polling those USB devices that do not support such an asynchronous notification scheme. At block 505, the USB controller defers to service the activity of an active USB device until a corresponding [micro] frame is scheduled to be serviced using in part the cached activity descriptors without having to access the main memory again in order to generate an interrupt transfer to the active USB device. Other operations may also be performed.

Figure 6:
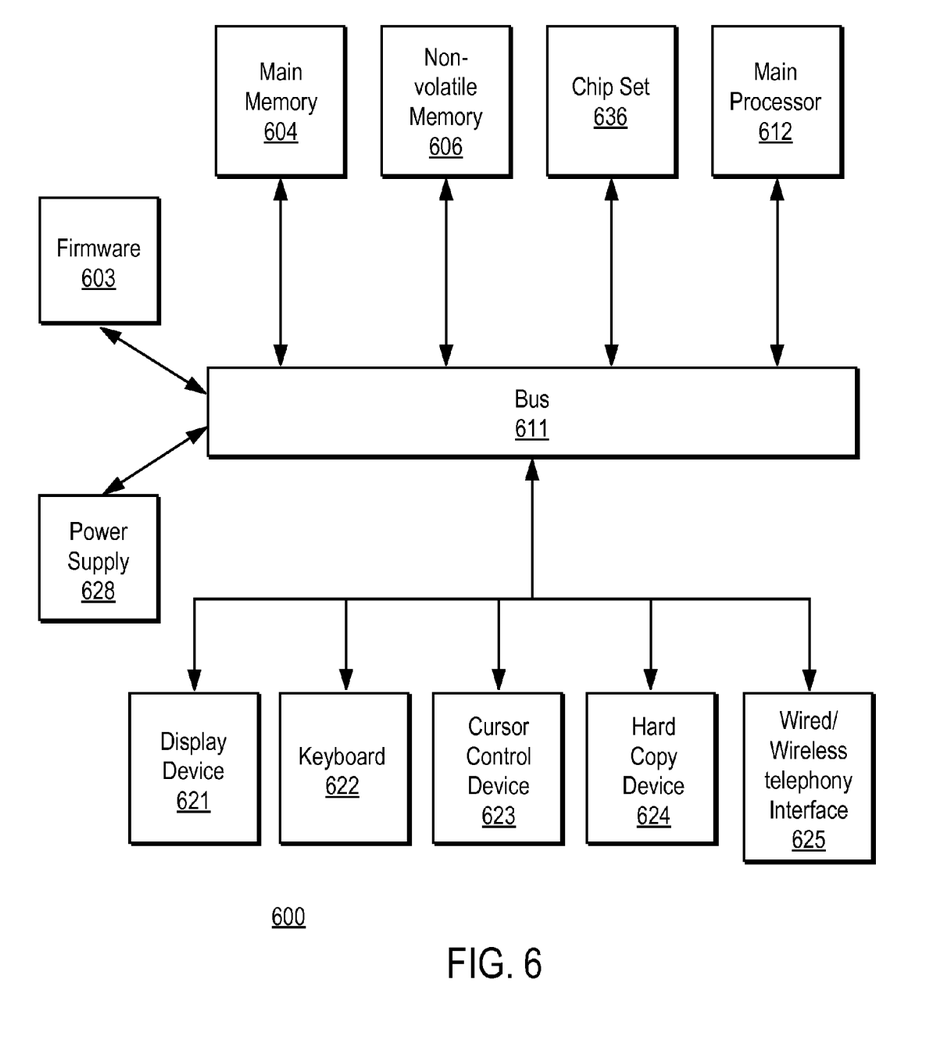
FIG. 6 is a computer system which may be used with an embodiment of the invention.

FIG. 6 is a block diagram of an example computer system that may use an embodiment of a USB controller having at least one of the features described above, such as, for example, at least one of an activity indicator, an activity descriptor cache, and/or an activity state register, as described above. In one embodiment, computer system 600 includes a communication mechanism or bus 611 for communicating information, and an integrated circuit component such as a main processing unit 612 coupled with bus 611 for processing information. One or more of the components or devices in the computer system 600 such as the main processing unit 612 or a chip set 636 may use an embodiment of the USB controller including at least one of an activity indicator, an activity descriptor cache, and/or an activity state register, as described above. The main processing unit 612 may consist of one or more processor cores working together as a unit.

Computer system 600 further includes a random access memory (RAM) or other dynamic storage device 604 (also referred to as a main memory) coupled to bus 611 for storing information and instructions to be executed by main processing unit 612. Main memory 604 may also be used for storing temporary variables or other intermediate information during execution of instructions by main processing unit 612.

Firmware 603 may be a combination of software and hardware, such as Electronically Programmable Read-Only Memory (EPROM) that has the operations for the routine recorded on the EPROM. The firmware 603 may embed foundation code, basic input/output system code (BIOS), or other similar code. The firmware 603 may make it possible for the computer system 600 to boot itself.

Computer system 600 may also include a read-only memory (ROM) and/or other static storage device 606 coupled to bus or interconnect 611 for storing static information and instructions for main processing unit 612. The static storage device 606 may store OS level and application level software. Computer system 600 may further be coupled to a display device 621, such as a cathode ray tube (CRT) or liquid crystal display (LCD), coupled to bus 611 for displaying information to a computer user. A chipset may interface with the display device 621.

An alphanumeric input device (keyboard) 622, including alphanumeric and other keys, may also be coupled to bus 611 for communicating information and command selections to main processing unit 612. An additional user input device is cursor control device 623, such as a mouse, trackball, trackpad, stylus, or cursor direction keys, coupled to bus 611 for communicating direction information and command selections to main processing unit 612, and for controlling cursor movement on a display device 621. A chipset may interface with the input output devices.

Another device that may be coupled to bus 611 is a hard copy device 624, which may be used for printing instructions, data, or other information on a medium such as paper, film, or similar types of media. Furthermore, a sound recording and playback device, such as a speaker and/or microphone (not shown) may optionally be coupled to bus 611 for audio interfacing with computer system 600. Another device that may be coupled to bus 611 is a wired/wireless communication capability 625. Other components may also be included.

Thus, method and apparatus to quiesce USB activities using interrupt caching and notifications have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A data processing system, comprising:
a processor;
a memory coupled to the processor selected from a group consisting of a DRAM (dynamic RAM) and SRAM (static RAM); and
a universal serial bus (USB) controller coupled to the processor and the memory, the USB controller including a local memory to cache at least one activity descriptor of at least a portion of a periodic schedule having a plurality of frames stored in the memory, the USB controller deferring to service an active USB device described by one of the activity descriptors until a corresponding frame is scheduled to be serviced subsequently, using an associated activity descriptor cached in the local memory,
wherein the activity descriptors include at least one interrupt descriptor having information required by the USB controller to generate an interrupt transfer for the corresponding active USB device, and
wherein the USB controller further comprises an interrupt state register to asynchronously store an activity state of at least a portion of one or more USB devices indicating whether a USB device has an interrupt pending.

2. The system of claim 1, wherein the active USB device is serviced by invoking an interrupt transfer described by a corresponding interrupt descriptor without having to access the memory.

3. The system of claim 1, wherein the USB controller further comprises an interrupt mode register to indicate which of the USB devices is able to asynchronously notify the USB controller regarding a pending interrupt of a corresponding USB device via the interrupt state register.

4. The system of claim 3, wherein the USB controller is configured to poll a remainder of the USB devices without having to poll the USB devices that are able to asynchronously notify the USB controller.

5. The system of claim 1, wherein during the deferred period, at least one of the processor, the memory, the USB controller, and one or more USB devices coupled to the USB controller to remain in a low power state.

6. The system of claim 1, wherein the USB controller further comprises an activity indicator to indicate which of the frames includes at least one activity descriptor, and wherein an activity of an active USB device described by a corresponding activity descriptor is serviced subsequently when the activity indicator indicates such an active USB device.

7. The system of claim 6, wherein the activity indicator includes a plurality of entries each corresponding to one of the frames, wherein each entry includes a first value to indicate that no activity descriptors exist for a given frame, a second value to indicate that at least one activity descriptor exists and is cached in the local memory of the USB controller, and an optional third value to indicate that at least one activity descriptor exists but it is not cached in the local memory of the USB controller.

8. The system of claim 1, further comprising a battery to power at least one of the processor, the memory, and the USB controller.

9. A universal serial bus (USB) controller, comprising:
a prefetcher to prefetch from an external memory at least a portion of a periodic schedule having a plurality of frames prior to the plurality of frames scheduled to be serviced;
a local memory coupled to the prefetcher to cache at least one activity descriptor of the prefetched frames to defer servicing an active USB device described by one of the activity descriptors until a corresponding frame is scheduled to be serviced subsequently, using the associated activity descriptor cached in the local memory, wherein the activity descriptors include at least one interrupt descriptor having information required by the USB controller to generate an interrupt transfer to the corresponding active USB device, and wherein the active USB device is serviced by invoking an interrupt transfer described by a corresponding interrupt descriptor without having to access the external memory; and
an interrupt state register to asynchronously store an activity state of at least a portion of one or more USB devices indicating whether a USB device has an interrupt pending.

10. The USB controller of claim 9, further comprising an interrupt mode register to indicate which of the USB devices is able to asynchronously notify the USB controller regarding a pending interrupt of a USB device via the interrupt state register.

11. The USB controller of claim 10, wherein a remainder of the USB devices is polled to determine whether a USB device is active without having to poll the USB devices that support the asynchronously notification.

12. The USB controller of claim 9, wherein during the deferred period, at least one of the USB controller and one or more USB devices remains in a low power state.

13. The USB controller of claim 9, further comprising an activity indicator to indicate which of the frames includes at least one active USB device, and wherein an activity of an active USB device described by a corresponding activity descriptor is serviced subsequently in response to the activity indicator.

14. The USB controller of claim 13, wherein the activity indicator includes a plurality of entries each corresponding to one of the frames, wherein each entry includes a first value to indicate that all USB devices are idle, a second value to indicate that at least one device is active with its activity descriptor cached in the local memory, and an optional third value to indicate that at least one device is active without caching its activity descriptor.

15. The USB controller of claim 9, further comprising a device containing the USB controller, the device including a battery power supply.

16. A computer implemented method, comprising:
prefetching from an external memory at least a portion of a periodic schedule having a plurality of frames prior to the plurality of frames scheduled to be serviced;
storing at least one activity descriptor of the prefetched frames in a local memory of a universal serial bus (USB) controller to defer servicing an active USB device described by one of the activity descriptors until a corresponding frame is scheduled to be serviced subsequently, using the associated activity descriptor cached in the local memory; and
asynchronously recording in an interrupt state register within the USB controller for at least a portion of two or more USB devices whether a USB device has an interrupt pending.

17. The method of claim 16, further comprising polling a remainder of the two or more USB devices to determine whether a USB device is active without having to poll USB devices that support an asynchronously notification.

18. A universal serial bus (USB) controller, comprising:
a first register to asynchronously record whether a USB device support an asynchronous notification between the USB device and the USB controller; and
a second register to asynchronously record whether the USB device has an interrupt pending without having the USB controller to poll the USB device to determine whether the respective USB device is active.

19. The USB controller of claim 18, further comprising a local memory to cache at least one interrupt descriptor of a plurality of frames stored in an external memory, wherein an active USB device described by one of the interrupt descriptors is deferred to be serviced until a corresponding frame is scheduled to be serviced subsequently, using the associated interrupt descriptor cached in the local memory.

20. The USB controller of claim 18, further comprising a device containing the USB controller, the device including a battery power supply.

* * * * *